Oct. 11, 1966 C. M. LEKVEN 3,278,904

HIGH SPEED SERIAL ARITHMETIC UNIT

Filed June 20, 1962 3 Sheets-Sheet 1

INVENTOR.
CARL M. LEKVEN
BY
ATTORNEY

Oct. 11, 1966 C. M. LEKVEN 3,278,904

HIGH SPEED SERIAL ARITHMETIC UNIT

Filed June 20, 1962 3 Sheets-Sheet 2

United States Patent Office 3,278,904
Patented Oct. 11, 1966

3,278,904

HIGH SPEED SERIAL ARITHMETIC UNIT

Carl M. Lekven, Burbank, Calif., assignor to General Precision, Inc., a corporation of Delaware

Filed June 20, 1962, Ser. No. 203,985
13 Claims. (Cl. 340—172.5)

The present invention relates to electronic binary digital computers, and it relates more particularly to an improved register system in a binary digital computer which is constructed so that information circulated through the register is controlled to be so circulated in a serial interlaced manner.

It is usual for the prior art electronic digital computers to include a plurality of registers which serve as a temporary storage for the information as it is being processed by the computer. For example, the arithmetic section of a typical electronic binary digital computer includes an accumulator register which is used for practically all arithmetic operations; and it also includes a multiplier register and a multiplicand register which are used for multiplication, division, square root and other arithmetic operations. These separate and distinct registers in the prior art computer serve to hold and shift the operands, quotients, dividends, and other information while the arithmetic process is being carried out, as is well known.

The separate and distinct registers in the prior art computers, as referred to above, are often of the recirculating type. These recirculating registers are usually formed to include tracks or channels on the main memory drum of the computer, such tracks serving as a storage medium for the recirculating register.

In the prior art computers, each of the aforementioned circulating registers represents a completely different entity. That is, each of the circulating registers requires a separate track on the memory drum, and separate components associated with the track.

For example, each of the prior art circulating registers requires an electromagnetic transducer write head and associated write amplifiers for enabling the information to be recorded on the corresponding track in the main memory; and each requires an electromagnetic transducer read head and associated read amplifiers for deriving the information from the associated track and for converting the same into electrical signals of usable amplitude. In addition to these components, each of the prior art circulation registers requires separate logic control and recirculating circuitry intercoupling the read and write amplifiers.

In accordance with a principal concept of the present invention, certain ones of the registers of the prior art computers are replaced by a single circulating register, and the control circuitry associated with the single register causes the information to be introduced to the register in a manner such that it circulates through the register in an interlaced serial form.

This replacement by the present invention of several registers of the prior art system by a single register eliminates the previous need for a multiplicity of read and write transducer heads and associated amplifiers. The concept of the present invention will be described herein as embodied in a high speed solid state digital computer.

In the computer to be described, the usual prior art memory drum is replaced by a high speed nickel-wire memory. However, it will become evident as the description proceeds that the single interlaced circulating register concept of the present invention is suitable for use in a wide variety of types of computers utilizing different types of memories, such as the magnetic memory drum or disc, or other types of memory storage devices.

For high speed purposes, it is preferred for the single interlaced circulating register system of the present invention which, as mentioned above, replaces several of the registers of the prior art computers, to incorporate an ultrasonic delay line for carrying the interlaced serial information. Recent advances in ultrasonic delay line technology have shown the feasibility of storing digital information directly in glass or fused quartz delay lines. This use of the fused quartz delay line obviates any need for a high frequency carrier.

The feasibility of the glass or fused quartz delay line for carrying the binary information has been further enhanced by recent developments by the Corning Glass Company. The Corning Electronics Division of that company has developed a new glass for delay line purposes, and which has essentially zero temperature coefficient. These delay lines are presently available with delays of from 20 to 150 microseconds, and with operating rates up to approximately 30 megabits per second. Very short pulses of the order of .02 to .04 microsecond can be stored directly on the delay lines without any need for the usual high frequency carrier.

In the practice of the present invention, the delay line forming the serial interlaced circulating register may be isolated from the main memory. When the delay line is used in conjunction with the usual magnetic drum type of memory, it permits much higher operating rates than the drum, and information can be circulated through the delay line at a rate, not impeded by the memory speed limitations.

This development of quartz delay lines, with their high speed capabilities, means that the actual solution rate of the computer of the invention, which of necessity is some fraction of the rate of circulation of information through the delay line itself, may be made comparable in speed to that of other prior art computers, but with a substantial simplification in circuitry and with a substantial elimination of many components essential for the proper operation of the prior art computers.

It is, accordingly, an object of the present invention to provide an improved circulating register system in an electronic binary digital computer, which permits the computer to be of simplified construction as compared with the prior art computers of the same general type and capabilities, and in which relatively expensive components, considered necessary in the prior art computers, may be eliminated.

Another object is to provide such an improved circulating register system for use in the arithmetic section of an electronic binary digital computer, and which is conceived so that the arithmetic section may be operated independently of the main memory, if so desired, for high speed operation in the arithmetic section which is not limited by any speed limitations which may be inherent in the main memory. The independent, high speed operation also simplifies the required control circuitry of the computer in that all arithmetic operations can occur in the basic word time of the main memory.

Another object is to provide such an improved circulating register system for an electronic binary digital computer, which permits the computer to be extremely simple in its construction as compared with the prior art computers of the same general type, but which is so conceived and constructed that the inherent simplicity thereof is achieved without any sacrifice in solution speed, precision, or reliability of the computer.

Another object of the invention is to provide such an improved circulating register system for use in an electronic digital computer, which is constructed to be readily adaptable for use with a nonmovable type of memory, so that the computer may be constructed for operation without the need for any mechanically moving parts.

A feature of the invention is the provision of a single circulating register system which may be incorporated in the arithmetic section of the computer to replace the plurality of arthimetic registers required by the prior art computers, the single register system of the present invention being capable of extremely high speed operation.

Another feature is the provision of such an improved circulating register which is capable of operating asynchronously with respect to the main memory so as not to be subject to any of the speed limitations which may be inherent in the main memory.

The computer to be described is particularly suitable for use in space vehicles in that it is small in size and light in weight. In addition, the computer to be described is low in power consumption, flexible and rapid in its computating capabilities, and it is extremely precise and reliable.

Other features, objects and advantages of the invention will become apparent from a consideration of the following specification, when taken in conjunction with the accompanying drawings, in which.

Figures 1, 2, 3:
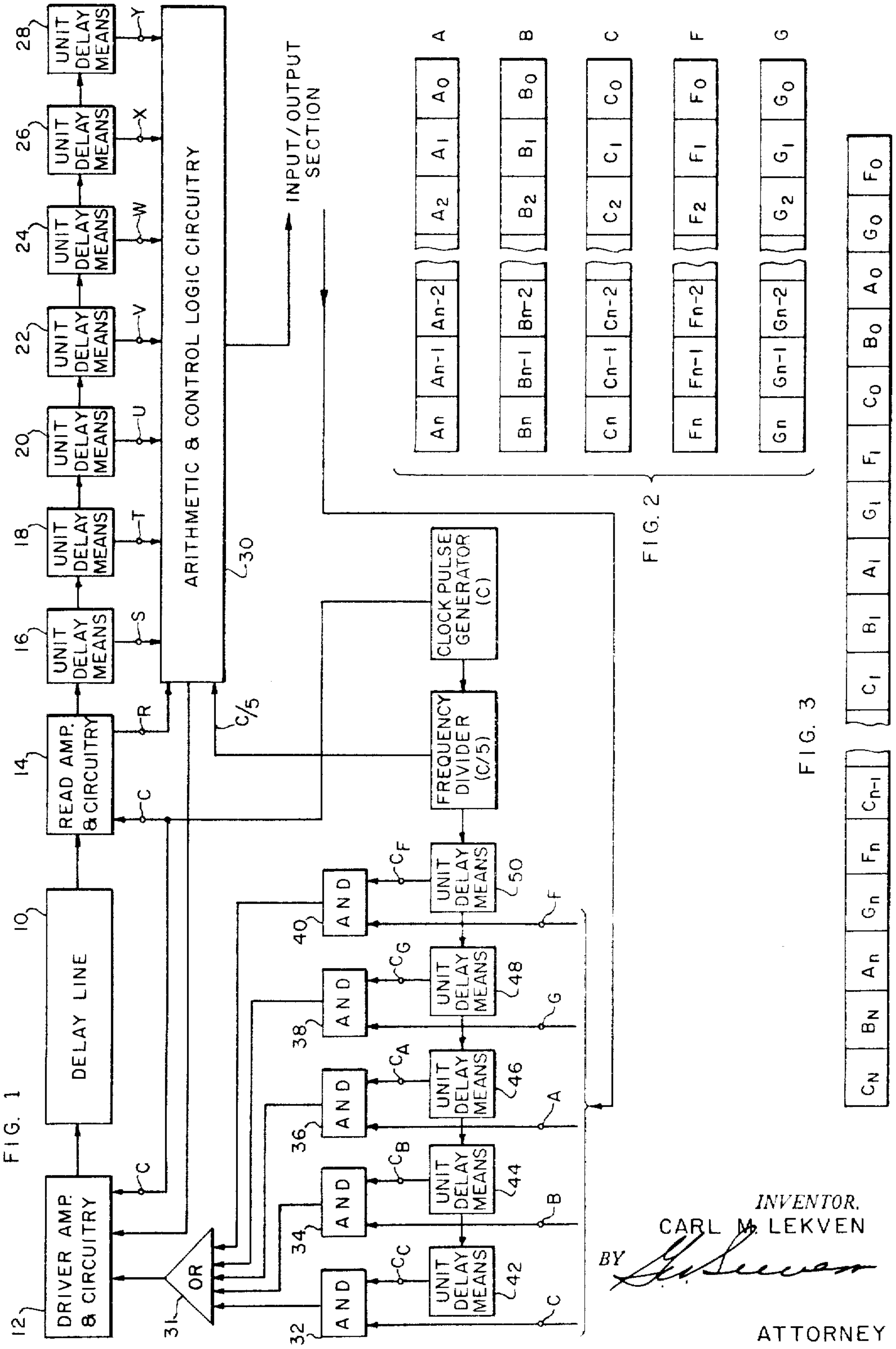
FIGURE 1 is a block diagram constituting a schematic representation of an arithmetic circulating register system constructed to incorporate the concepts of the present invention.
FIGURE 2 is a representation of the different register contents which may be incorporated into the single register system of FIGURE 1.
FIGURE 3 is a representation of the interlaced relationship of the various register contents circulated through the register system of FIGURE 1.

The arithmetic circulating register system shown schematically in FIGURE 1 is constructed, as noted, to incorporate the concepts of the present invention, in that a single circulating register is used to store all the information required to perform the various arithmetic operations.

The system of FIGURE 1 includes a single delay line 10 having suitable driver circuitry associated with its input end, and having suitable read circuitry associated with its output end. The driver circuitry is represented by the block 12, and the read circuitry is represented by the block 14.

The block 14 is designated as the read amplifier and circuitry and it is coupled to a unit delay means 16. The unit delay means 16 may be of any appropriate composition, such as a delay line, flip-flop or other suitable component, which is capable of providing a unit bit time delay to the information circulating through the system of FIGURE 1.

The unit delay means 16 is connected to a series of similar unit delay means 18, 20, 22, 24, 26 and 28 which are connected in series with one another and with the unit delay means 16. The unit delay means 16, 18, 20, 22, 24, 26 and 28 provide access to the circulating register which incorporates the delay line 10 at different bit times. These unit delay means, and the block 14, are all coupled to appropriate arithmetic and control logic circuitry represented by the block 30. The logic circuitry represented by the block 30 is also coupled to the input/output section of the computer in which the system of FIGURE 1 is included, so that information from the arithmetic section may be read out of the computer.

The arithmetic and control logic circuitry forms the usual arithmetic circulating loop for the register, and the output from the block 30 is coupled back to the driver amplifier and circuitry 12. The arithmetic networks in the block 30 serve to modify the circulating information so that the various arithmetic operations may be performed on the information, as will be described in more detail subsequently.

The system of FIGURE 1 includes a clock pulse generator (C) of any usual type, and this generator is coupled to a frequency divider (C/5). In the illustrated embodiment, the frequency divider (C/5) divides the clock pulses from the clock pulse generator (C) in the ratio of 5:1. The clock pulse generator (C) provides clock pulses to the read amplifier 14, and these may occur at the rate of, for example, 20 megacycles. The clock pulses from the generator (C) serve to clock the information circulating through the register including the delay line 10. The clock pulses from the frequency divider (C/5), on the other hand, clock the arithmetic components in the block 30, so that the solution rate proceeds, for example, at the rate of 4 megacycles in the illustrated embodiment.

As noted above, the different register information circulates through the delay line 10 in interlaced manner, and this information may be applied to the register including the delay line 10 through appropriate logic circuitry.

The logic circuitry is represented by an "or" gate 31 which is coupled to the block 12; and by a plurality of "and" gates 32, 34, 36, 38 and 40 which are coupled to the or gate.

A series string of unit delay means 42, 44, 46, 48 and 50 are coupled to the frequency divider (C/5). These unit delay means may be similar to the unit delay means 18 described above. The unit delay means 42, 44, 46, 48 and 50 are respectively coupled to different ones of the and gates 32, 34, 36, 38 and 40. These delay means provide respective bit timing pulses $C_A$, $C_B$, $C_C$, $C_F$ and $C_G$ to the various and gates, these bit timing pulses each being delayed by successive bit times with respect to the bit timing pulses from the frequency divider (C/5).

The various pieces of multidigit binary input information is derived from the input/output section of the computer, and they are introduced through appropriate control and logic circuitry to the different and gates 32, 34, 36, 38 and 40. The different pieces of binary digital information are designated respectively as A, B, C, F and G in FIGURE 1.

The delay line 10, as mentioned above, may be formed of glass or fused quartz, and it is preferably of the type which is capable of storing digital information without the need for a high frequency carrier. The register contents to be carried by the delay line in the illustrated embodiment are designated A, B, C, G and F, as mentioned above. These register contents, as explained, are in the form of different pieces of multi-bit digital information, as illustrated in FIGURE 2.

The information illustrated in FIGURE 2 is, in each instance, composed of *n* binary bits. The register contents A is illustrated as being made up of successive binary bits $A_0$, $A_1$, $A_2$ . . . $A_{n-1}$. Likewise, the register contents B is illustrated as being made up of successive binary bits $B_0$, $B_1$, $B_2$ . . . $B_{n-1}$, $B_n$; the register contents C is illustrated as being composed of successive binary bits $C_0$, $C_1$, $C_2$ . . . $C_{n-1}$, $C_n$; the register contents F is composed of successive binary bits $F_0$, $F_1$, $F_2$ . . . $F_{n-1}$, $F_n$;

and the register contents G is composed of the binary bits $G_0, G_1, G_2 \ldots G_{n-1}, G_n$.

The register contents of FIGURE 2 are individually read into the arithmetic system of FIGURE 1 in such a manner that the binary bits of each piece of information are displaced from one another by a predetermined number of bit positions. In the illustrated embodiment in which five different pieces of information are circulated through the delay line 10 and its associated circuitry, the successive bits of each piece of information are spaced from one another by five bit positions in the delay line.

For example, the piece of information A is read into the system, at clock times having a C/5 repetition frequency, and at bit positions in the delay line 10 as determined by the unit delay means 46, 48 and 50. Likewise, the unit delay means associated with the frequency divider (C/5) determines the bit positions of the other pieces of information in the circulating register of the delay line 10. Each separate piece of information of FIGURE 2 is completely read into the system of FIGURE 1, before a second piece of information is read into the system.

When the input operation is complete, and all the pieces of information A, B, C, F and G have been read into the system of FIGURE 1, the contents of the register circulating through the delay line 10 and its associated components has the composition illustrated in FIGURE 3. An examination of FIGURE 3 will reveal that the various register contents circulating in the system of FIGURE 1 are interlaced with one another, so that a purely serial operation may be achieved.

It will be appreciated that at successive clock time C/5 the successive bits of the different interlaced pieces of register information will appear in the various unit delay means 16, 18, 20, 22, 24, 26 and 28. For example, at successive C/5 bit times, the successive bits of the register contents F appear at the output terminal Y of the unit delay means 28; the successive bits of the register contents G appear at the output terminal X of the unit delay means 26; the successive bits of the register contents A appear at the output terminal W of the unit delay means 24; the successive bits of the register contents B appear at the output terminal V of the unit delay means 22; and the successive bits of the register contents C appear at the output terminal U of the unit delay means 20.

In like manner, at successive clock bit times C/5, the successive bits of the register contents F appear at the output terminal T of the unit delay means 18, displaced C/5 bit times from the output from the unit delay means 28; the successive bits of the register contents G appear at the output terminal S of the unit delay means 16 displaced C/5 bit times from the output at the terminal X of the unit delay means 26; and the successive bits of the register contents A appear at the ouput terminal R of the block 14 displaced C/5 bit times from the output appearing at the terminal W of the unit delay means 24.

The different register contents are circulated in the system of FIGURE 1 and through the delay line 10 in the interlaced manner shown in FIGURE 3, as mentioned above. The single register system of FIGURE 1 takes the place, therefore, of five registers which would be required in an equivalent prior art computer, these being designated A, B, C, F and G registers.

The different register contents in the single register of the invention appear respectively at the read amplifier 14 and at the different unit delay means 16, 18, 20, 22, 24, 26 and 28 during successive C/5 clock times, as described above. That is, for each bit timing pulse produced by the frequency divider (C/5), the successive bits $A_0, A_1 \ldots$ of the A register contents appear at the output terminal Y for introduction to the arithmetic and control logic block 30, the successive bits $B_0, B_1 \ldots$ of the B register contents appear at the output terminal X; and so on, as described above.

The A register contents, for example, may constitute the accumulator register, and the B and C register contents may constitute the multiplier and the multiplicand registers of the arithmetic section. The different A, B and C register contents are introduced simultaneously to the arithmetic control and logic circuitry 30, so that all the usual prior art arithmetic operations may be performed in the manner well understood to the art.

The F register contents in the single register of the invention may function as a word timing indication. This latter register is cleared to zero, and it is then loaded with a single unity bit which occurs, for example, at $F_0$ bit time, when the computer power is first turned on. This F register bit establishes the beginning of the word times in the arithmetic register system of the invention.

The G register contents may also be used for timing purposes, and a single unity bit is inserted into the G register when the computer power is first turned on. Unlike the F register, however, the unity bit of the G register is shifted a bit position for each complete circulation in the system of FIGURE 1 during the input operations, and is also shifted a bit position for each complete circulation during the execution of an instruction. The unity bit in the G register is reset to its original position after the execution of each instruction.

Therefore, when the computer which incorporates the arithmetic system of FIGURE 1 is first turned on, the unity bit $F_0$ is introduced to the register through the and gate 40 at the proper bit time to occupy the proper bit position, and this unity bit is followed by appropriately timed 0 bits at the $F_1, F_2 \ldots F_{n-1}, F_n$ bit positions, until the entire contents of the F register are introduced into the system of FIGURE 1.

In like manner, a unity bit is then introduced into the G register through the and gate 38 at the proper $G_0$ bit position, and this bit is followed by 0 bits at the $G_1, G_2 \ldots G_{n-1}, G_n$ bit positions, these latter bits of the G register being properly timed to occupy their correct interlaced bit positions in the register of the invention, as shown in FIGURE 3.

In like manner, the and gates 32, 34 and 36 are conditioned for translation, and properly timed, so that the register contents A, B and C may be introduced individually into the register system of the invention, so as to occupy the proper interlaced bit positions, as also shown in FIGURE 3.

During the first word time of the execution of an asynchronous operation, the unity bit in the G register, as mentioned above, is shifted left one position during each recirculation cycle. At the beginning of the word time, the unit bit in the F register, for example, appears at the terminal Y in time coincidence with the appearance of the unity bit in the G register at the terminal X, as mentioned above. When these bits regain coincidence, the completion of a one-word type of arithmetic operation at the C/5 rate is established. It will be appreciated, of course, that although the information circulates through the system of the delay line 10 at the C, or 20 megacycle rate, the actual information utilized to perform arithmetic solutions by the block 30 provides at the submultiple C/5, or 4 megacycle rate.

During the asynchronous serial input introduction of the bits of any particular piece of information to the system of FIGURE 1, such as the register contents $A_0, A_1, A_2 \ldots$; the unit bit in the G register shifts from one bit position to the next for each bit of the A register contents introduced to the system, so that the G bit may be used to mark the position in which the particular A bit is to be stored. The coincidence of the unit bits in the F and G register will mark the completed input operation for any particular word, as mentioned above, which input operation will require at least *n* word times for any *n*-bit word. The output operation may be mechanized and controlled in the same manner.

During the multiplication or divide operation, a flip-flop is controlled by the F and G register contents circulating in the system of FIGURE 1. This flip-flop selects the portion of the register system of FIGURE 1 appropriate for storing the partial product. The partial product is found by adding the multiplicand to the partial product in the arithmetic and control logic block 30 of FIGURE 1. During each add or non-add cycle of the multiplication operation, as specified by the multiplier, the multiplicand register contents is shifted left so as to prepare it for the next cycle. The G register contents is shifted left one bit position for each word time during the multiplication operation, so that when the unit bit in the G register regains coincidence with the unity bit in the F register, the operation is caused to be completed.

Figure 4:
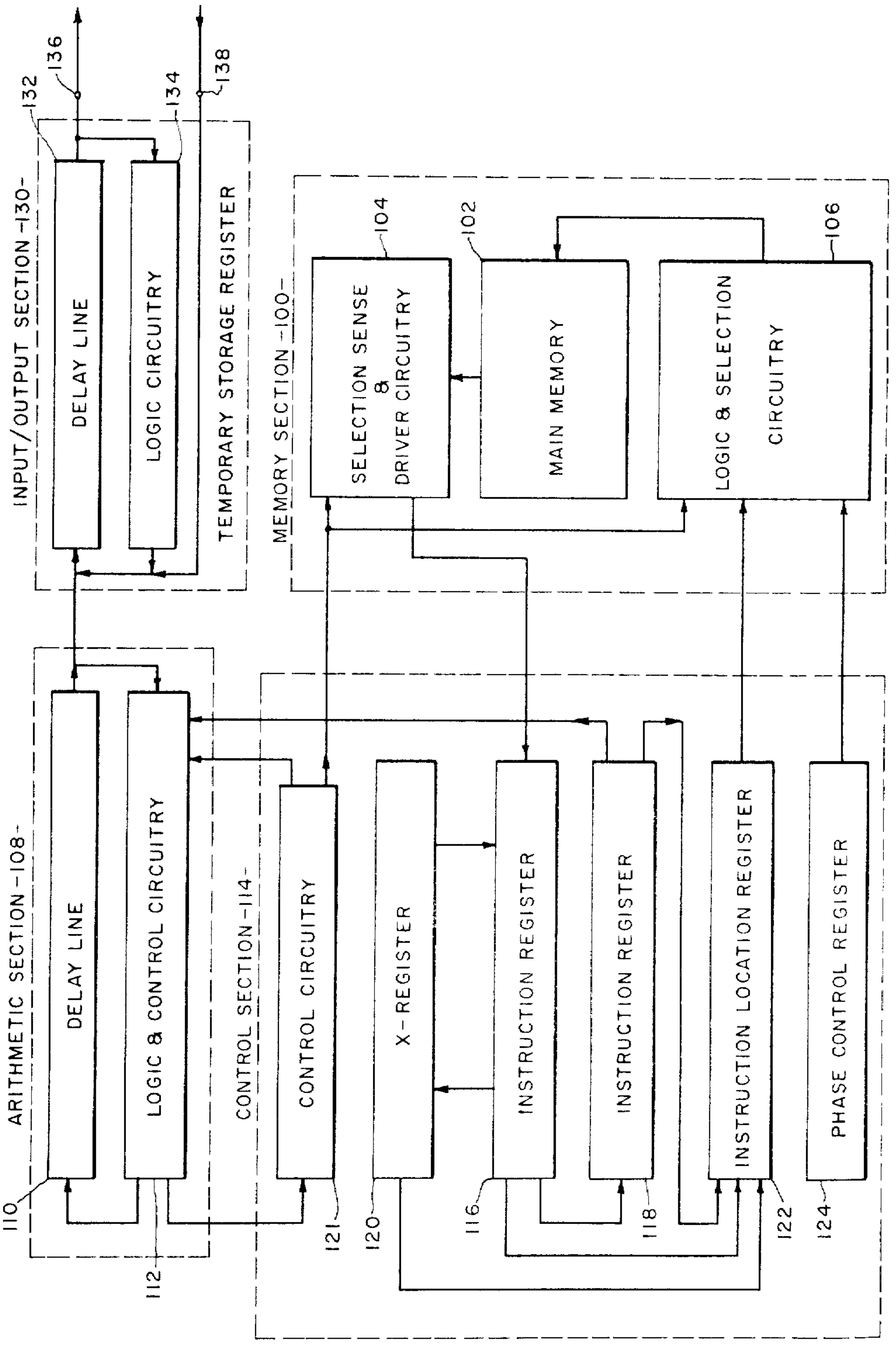
FIGURE 4 is a block diagram schematically representing an electronic digital computer constructed to incorporate the circulating register arithmetic section of the present invention.

The single interlaced circulating register arithmetic system of the invention, as described in conjunction with FIGURE 1, may be incorporated in a solid state, general purpose digital computer, such as shown in FIGURE 4. The computer of FIGURE 4 is especially suitable for use in ballistic missile guidance and control systems, satellite booster guidance and control systems, and the like. This is because the computer shown schematically in FIGURE 4 may be constructed to be small in size and light in weight. Also, the illustrated computer may be constructed to be low in power consumption, and flexible, rapid, precise and extremely reliable in operation.

The digital computer illustrated schematically in FIGURE 4 includes a memory section 100 which, in turn, includes a main memory designated by the block 102. The main memory may be composed, as will be described, of a plurality of nickel-wire memory units. Appropriate selection sense and driver circuitry represented by the block 104, is coupled to the main memory 102, as is appropriate logic and selection circuitry, designated by the block 106.

The computer of FIGURE 4 also includes an arithmetic section 108 which may incorporate the concepts of the invention and which may be similar in general to the arithmetic section described in conjunction with FIGURE 1. The arithmetic section 108 includes a single register, incorporating the delay line 110, and associated logic and control circuitry 112, to perform all the arithmetic register functions.

Coupled to the memory section 100 and to the arithmetic section 108 is a control section 114. This control section performs all the necessary controls for the computer, and it includes a pair of instruction registers 116 and 118. Also included is a supplemental register 120 designated the "X-register." Appropriate control circuitry 121 is also included in the control section. An instruction location register 122, and a phase control register 124 are also included in the control section.

An input/output section 130 is coupled to the arithmetic section 108. The input/output section 130 may include one or more temporary storage registers. These temporary storage registers may also be constructed in accordance with the concepts described above in conjunction with FIGURE 1 to include a delay line, such as the delay line 132, and associated logic circuitry 134 which provides a recirculating path for the delay line. Output access from the input/output section is provided by an output terminal 136 coupled to the output of the delay line 132, and input access is provided by an input terminal 138 which is coupled to the input of the delay line 132. It will be appreciated that the output and input terminals may be connected to suitable and appropriate output and input devices associated with the computer.

The operation of the computer of FIGURE 4 is serial, with a single address system being used. That is, at the completion of the execution of any particular instruction, the instruction location register 122 is stepped one step so as to indicate the location of the next instruction to be executed. This, of course, is merely representative of one computer organization in which the concept of the present invention can be incorporated. The invention, of course, is not limited to any particular computer organization.

Figures 5, 6, 7, 8:
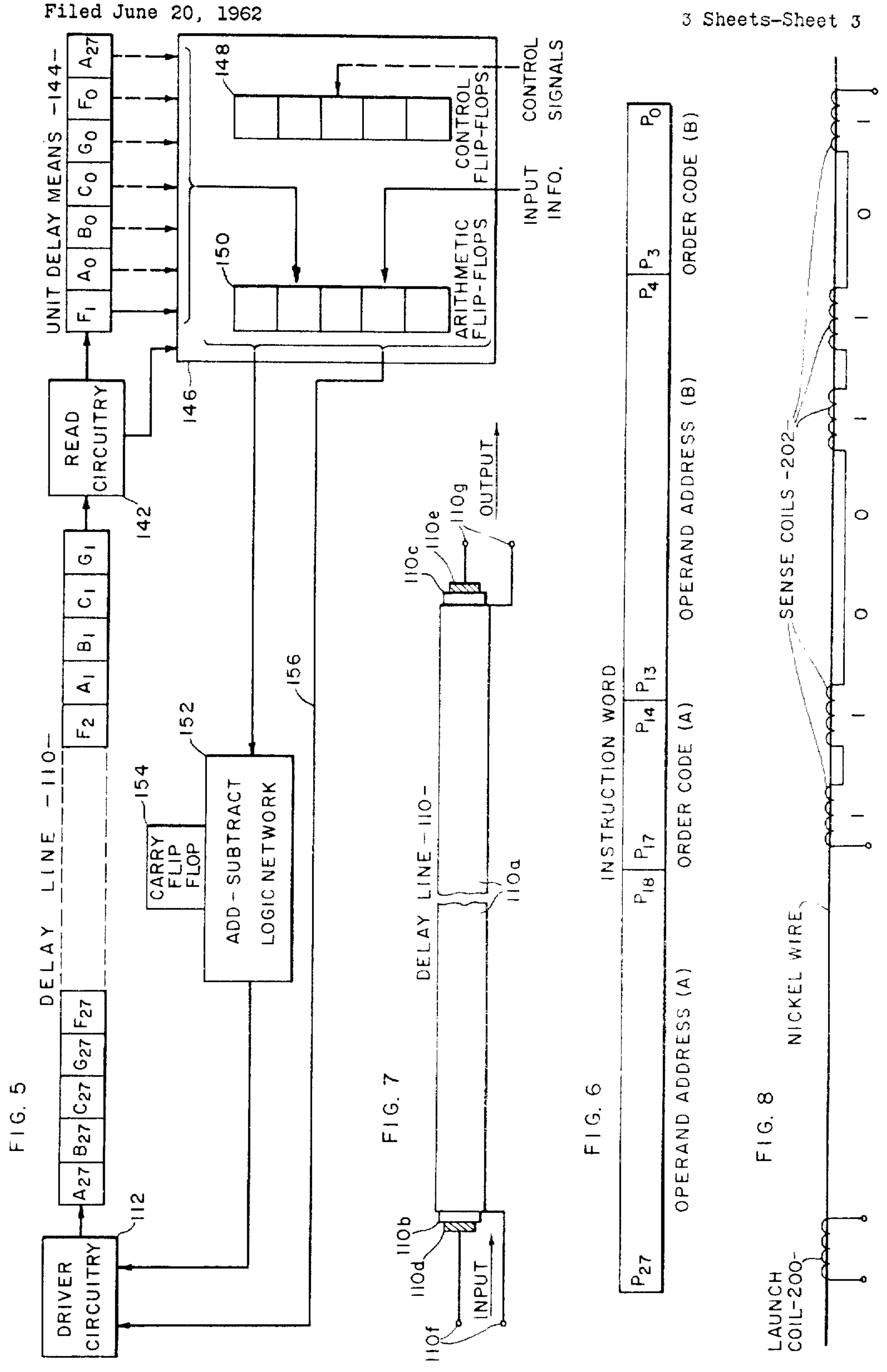
FIGURE 5 is a schematic block diagram of the arithmetic section of the computer of FIGURE 4.
FIGURE 6 represents the composition of the instruction word utilized in the computer of FIGURE 4.
FIGURE 7 is an illustration of an ultrasonic delay line for use in the system of the invention.
FIGURE 8 is a nickel-wire memory unit for use in the computer to be described.

Two consecutive instructions are contained in one instruction word, and these are read from the memory at any one time. The entire double instruction would contains two order code fields and two operand location fields, as shown in FIGURE 6.

The arithmetic section 108 of the computer of FIGURE 4 includes a single delay line 110 with its associated drive and sense circuitry. The single delay line 110 replaces all the registers usually required in the arithmetic section of the computer, as well as the additional logic circuitry and flip-flops normally associated with such additional registers.

As noted previously, the delay line 110 may be a quartz ultrasonic delay line. Present-day quartz technology makes it possible to achieve serial storage at up to 30 megacycle bit rates and over a wide temperature range. This is achieved, as noted above, by the use of low temperature coefficient glasses.

In the past, the use of delay lines for the storage of digital information has usually required the use of modulated radio frequency signals as the information carrier. However, as mentioned previously herein, by proper design of the acoustical and electrical characteristics of the quartz delay line, direct storage of the digital signals may be achieved, thereby eliminating the need for the cumbersome radio frequency carrier techniques of the prior art.

Therefore, the advances in glass technology, coupled with the use of digital pulses instead of radio frequency bursts, enables the quartz delay lines to be utilized to advantage for the storage of the digital information in the arithmetic section 108 of the high speed serial computer of FIGURE 4.

Through the interlaced relationship described in conjunction with FIGURES 1–3, the contents of five individual arithmetic and control registers are circulated through the delay line 110 in the arithmetic section 108.

While the basic clock rate of the delay line 110 is, for example, 20 megacycles; the register interlace yields an effective 4 megacycle bit rate for each individual register, as previously explained. The arithmetic section 108 of the computer to be described is capable, for example, of exciting sixteen different orders.

The single delay line 110 in the arithmetic section 108 is used in a recirculating mode, as described in FIGURES 1–3, to provide an interlaced storage medium for the arithmetic section. The recirculating loop formed by the delay line 110, and its associated circuitry 112, forms the five interlaced registers described above. As previously mentioned, three of these registers, namely, the A, B and C registers, are used for arithmetic manipulation; and two of the registers, namely the F and G registers are used for control and timing.

The delay line 110 and its associated circuitry are shown in somewhat more detail in the schematic representation of FIGURE 5. As shown in FIGURE 5, for example, the delay line 110 has appropriate driver circuitry 140 coupled to its input end, and appropriate read circuitry 142 coupled to its output end. The read circuitry 142 is coupled to a series of unit delay means 144 which are similar in composition to the unit delay means 18, 20, 22, 24, 26 and 28 described in conjunction with FIGURE 1. The read circuitry 142 and unit delay means 144 are coupled to a block 146 which includes certain control flip-flops 148 and certain arithmetic flip-flops 150.

The control flip-flops 148 responds to received control signals to control the operation of the arithmetic unit in accordance with usual computer principles. Likewise, the arithmetic flip-flops 150 respond to input information to alter the information circulating in the arithmetic section, also in accordance with usual prior art computer principles.

The block 146 is coupled through a usual add-subtract logic network 152 back to the driver circuitry 112 to complete the circulating loop. The add-subtract network 152 has a usual carry flip-flop 154 associated with it to provide the proper carry control to the circulating information. The block 146 is also directly coupled through a lead 156 to the driver circuitry 112.

The five registers of the arithmetic section are considered to be 28 bit registers in the computer of FIGURE 4. These registers are designated respectively as the A, B, C, G and F registers, as described in conjunction with FIGURES 1–3. The F register, as described, contains permanent information which marks the beginning of the recirculation loop and controls the phasing of the computer operations.

The G register, as described, is used in conjunction with the F register to control multiple word arithmetic operations and to indicate their completion.

The A register is the main arithmetic accumulator; and it is extended, when necessary, by the B register. This extension is used, for example, in the multiplication operation to provide storage space for a double length product, when such is required.

The C register is primarily required to store the multiplicand for the multiplication operations, and the divisor for the division operations. The C register is also useful for storing intermediate results which will be needed for the subsequent operations.

The unit delay means 144 provides access to the recirculating information in the register formed by the delay line 110 and its associated circuitry, as explained above. The arithmetic operations are performed by the block 146 and the associated logic network 152 which properly modify the recirculating information under the control of the control flip-flops 148.

New information to be entered into the arithmetic section is routed through the logic block 146, and through the arithmetic flip-flops 150.

It will be appreciated that the unit delay means 144 present the different register contents to the logic block 146 simultaneously, and in exactly the same manner in which the separate registers of the prior art present to equivalent logic circuitry the register contents to the arithmetic components. The arithmetic components 146, 152 and 154 accept the information and act on it in a manner similar to corresponding prior art circuits. For that reason, it is believed unnecessary to encumber the present description with a detailed circuit and logic explanation of the manner in which the circuitry in the arithmetic section 108 deals with the circulating information.

A recirculating register arithmetic system, such as the system of FIGURE 5, has been constructed and operated at 20 megacycle bit rates. Different delay lines, such as the delay line 110, in the constructed embodiments of the invention exhibited delays between 2 and 100 microseconds, both for the return-to-zero and non-return-to-zero type of storage signals.

The simplicity of the single register serial operation of the system of FIGURE 5, its lack of moving parts, compact size, insensitivity to vibration and temperature changes; combined with its first access capabilities, give the system all the advantages of the magnetic drum or magnetostrictive delay line types of memories, without the inherent disadvantages to be found in the prior art memories. The delay line circulating register of FIGURE 5 is also capable of a much higher bit rate capability than the prior art type of memories.

The quartz delay line 110 may comprise an elongated rod of ground fused quartz, or fused silica, designated 110*a* in FIGURE 7. A pair of quartz crystals 110*b* and 110*c*, as shown in FIGURE 7, are affixed to the respective ends of the rod 110*a* to function as electro-acoustical transducers. The crystals 110*b* and 110*c* are cut to a particular thickness determined mainly by the bit rate and length of the rod 110*a*.

Each of the transducers formed by the crystals 110*b* and 110*c* is bonded to the corresponding end of the rod 110*a*. A pair of acoustical backing members 110*d* and 110*e* are bonded to respective ones of the crystals 110*b* and 110*c* for acoustical matching purposes.

Input terminals 110*f* are connected to opposite sides of the crystal 110*b*, and output terminals 110*g* are connected to opposite sides of the crystal 110*c*.

The introduction of a signal across the input terminals 110*f* causes the corresponding crystal transducer 110*b* to distort and launch an acoustical pulse down the quartz delay line. When the acoustical pulse reaches the far end of the delay line, the resulting distortion of the quartz crystal transducer 110*c* produces a corresponding output pulse across the output terminals 110*g*.

The two instruction registers 116 and 118 in the control section 114 are, for example, static flip-flop registers. Each of these registers is adapted to receive and hold a 14 bit instruction. The instruction word, as shown in FIGURE 6, includes two 4 bit order code fields, and two 10 bit operand address fields.

The control section 114 also includes the X register 120 which may, for example, be a 3 bit static flip-flop register. The X register serves to extend the operand location or address field of any particular instruction word.

The instruction location register 122 is a 13 bit static flip-flop register, and it serves to select the successive instruction words out of the memory 102. This register is controlled, as mentioned above, to increment from one instruction to the next as the program continues and under a usual incrementing control.

The instruction location register 122 is also used to select the operands out of the main memory 102 during the execution of any particular instruction. During its operand-selection mode of operation, the register 122 is controlled by the operand instruction fields in the instruction registers 116 and 118 through usual logic control circuitry.

The normal operation of the computer in the execution of any particular instruction proceeds through an instruction read-in phase, after which the instruction in the instruction register 116 is executed, and then the instruction in the instruction register 118 is executed.

The instruction read-in phase lasts two word times, during which the instruction selected by the instruction location register 122 is read into the instruction registers 116 and 118. Then, under the control of the phase control register 124, the instructions in the instruction registers 116 and 118 are successively executed, and the cycle is repeated.

The main memory 102 in the memory section 100 may be composed for a plurality of nickel-wire units, to be described. The memory read-out is of the serial, random access, nonvolatile, non-destructive type. The memory may be controlled to operate, for example, at the 4 megacycle rate. In the embodiment of FIGURE 4, each memory word is composed of 28 bits. The words are stored in blocks, and the capacity of the main memory can be tailored to any particular application. In a particular constructed embodiment of the invention, the memory, for example, was designed to include 16 blocks of 512 units in each block.

The main memory 102 is used to store instruction words and operands representative of constants. The read-out operation of a selected memory nickel-wire unit is obtained by launching an acoustic pulse down the corresponding wire. The acoustic pulse induces a signal in each sense coil as it passes under the sense coils, as will be described in somewhat more detail subsequently.

The memory 102 may be arranged so that the same launch coil may be used in conjunction with a single nickel-wire to form a pair of memory units. To this end, the launch coil is mounted at the center of the nickel-wire and the resulting acoustical pulse passes in both directions down the wire. The sense coils forming a particular memory unit may be mounted on the wire on one side of the launch coil, and those forming a second memory unit may be mounted on the other side of the launch coil. Due to such a physical mode of operation, it is possible to form a dual selection scheme based on input or launch coil selection and on output or sense amplifier selection.

The basic principle employed in the nickel-wire units contained in the main memory 102 is the Joule effect, or Joule magnetostriction. That is, most ferromagnetic materials exhibit a tendency to change their length when placed in a magnetic field. In the case of the nickel-wire memory unit, a nickel-wire is used as the magnetostrictive material.

The nickel-wire in each memory unit contracts when placed in a magnetic field by virtue of the Joule effect. This effect is reversible in that a change in the length of the nickel-wire also causes a change in the magnetic field adjacent the disturbed area of the wire. The disturbance propagates down the nickel-wire at the speed of sound in that medium.

Each memory line in the main memory 102 includes, for example, a launch coil 200 (FIGURE 8) and a plurality of sense coils 202. In the embodiment of FIGURE 8, the launch coil is illustrated as mounted at one end of the nickel-wire. However, as mentioned above, the launch coil may be mounted in the middle of a nickel-wire, with the sense coils for separate memory units being disposed on each side of the launch coil. A number of sense coils 202 are mounted on the nickel-wire, as shown in FIGURE 8. The number of sense coils depends upon the number of bits desired. For any particular piece of information, and as shown in FIGURE 8, a sense coil is provided for each bit position in which the stored memory word exhibits a unity bit.

The application of a pulse to the launch coil 200 causes an acoustical launch pulse to travel down the nickel-wire, as mentioned above. As the acoustical pulse travels down the wire, it passes under the sense coils 202 in a serial manner succesively to introduce a voltage in each sense coil and thus create a serial output.

As noted, a sense coil 202 is placed on the nickel-wire for each 1 and no coil is placed on the wire for each 0. Thus, upon the launching of a launch pulse down the nickel-wire, a readout pulse is produced for every 1 of the word stored in the particular memory unit, and no read-out pulse is produced for every 0 bit of that word.

The nickel memory described briefly above is well suited for use in the computer, when the computer is to be used for space purposes. However, it should be pointed out that the single register type of memory section forming the subject matter of the present invention is adapted to be utilized in conjunction with any desired type of computer memory.

The input/output section 130 includes one or more circulating registers, as mentioned above, such as the register composed of the illustrated delay line 132 and associated logic circuitry 134. These registers in the input/output section provide the desired temporary storage for information to be read into the computer and to be read out of the computer.

The delay line 132 in the input/output section may be similar to the delay line 110 in the arithmetic section 108. As in the arithmetic section, the information may be stored in an interlaced manner in the registers of the input/output section.

As noted above, the input/output section 130 contains registers, logic and selection circuits, used for the acceptance of information from external systems and devices and for the presentation of information to the external devices and systems.

The invention provides, therefore, an improved type of register system which finds particular application in the arithmetic section of the computer. In the improved type of register system of the invention, the information is controlled to be introduced to the register in interlaced manner. The high speed circulation capabilities of the register system render this feasible, in that appropriate control circuitry may be provided for selecting the different pieces of interlaced information and for utilizing the same at solution rates which represent no degradation in speed with respect to the prior art computers.

The improved single register system of the invention enables high speed computers to be constructed, as described above, with a minimum of components, and which are compact in size and light in weight. Moreover, the improved system of the invention enables such computers to be extremely reliable in operation.

While a particular embodiment of the invention has been shown and described, modifications may be made. It is intended in the claims to cover all such modifications as fall within the spirit and scope of the invention.

What is claimed is:

1. In combination: register means for storing digital information in a series of bit positions; input circuit means coupled to said register means for introducing a particular piece of multibit digital information to said register means to be stored therein in bit positions spaced a predetermined plurality of bit positions from one another; output circuit means coupled to said register means for utilizing said particular piece of multibit digital information stored therein; and control means coupled to said output circuit means for causing the same to accept only information at the bit positions of said particular piece of digital information to the exclusion of other information in said register means.

2. In a circulating register, the combination of: delay means for carrying digital information in a series of bit positions; input circuit means coupled to said delay means for introducing a particular piece of multibit digital information to said delay means to be carried thereby in bit positions spaced a predetermined plurality of bit positions from one another; output circuit means coupled to said delay means for utilizing said particular piece of multibit digital information carried thereby; and control means coupled to said output circuit means for causing the same to accept information only at the bit positions of said particular piece of digital information to the exclusion of any other information carried by said delay means.

3. In a circulating register, the combination of: delay means for carrying the bits of a plurality of pieces of digital information interlaced with one another in a series of adjacent bit positions to circulate through said delay means at successive bit times; input circuit means coupled to said delay means for introducing a particular piece of digital information to said delay means to be carried thereby in bit positions time spaced a predetermined plurality of bit times from one another; output circuit means coupled to said delay means for utilizing said particular piece of digital information carried thereby; and control means coupled to said output circuit means to cause the same to be activated at times corresponding to said predetermined plurality of bit times to accept successive bits of said particular piece of multi-bit digital information to the exclusion of any other information in said register means.

4. In an electronic digital computer, the combination of: delay means for circulating the bits of a plurality of pieces of binary digital information interlaced with one another in a series of bit positions circulating through said delay line at successive bit times; input circuit means coupled to said delay line for introducing a particular piece of multibit binary digital information to said delay means to be carried thereby; timing control circuitry coupled to said input circuit means for causing the same to introduce said particular piece of digital information to said delay means in bit positions time spaced a predetermined plurality of bit times from one another; output circuit means coupled to a particular position of said register means for utilizing said particular piece of multibit digital information stored therein; and circuit means coupled to said timing control circuitry for introducing to said output circuit means a series of bit timing pulses time spaced from one another by a time interval corresponding to said predetermined number of bit times, so as to cause said output circuit means to accept successive bits of said particular piece of digital information to the exclusion of any other information carried by said delay means.

5. In an electronic digital computer, the combination of: delay means for circulating the bits of a plurality of pieces of binary digital information interlaced with one another in a series of bit positions circulating through the delay means at successive bit times; input circuit means coupled to said delay means for introducing a plurality of pieces of multibit binary digital information to said delay means to be carried thereby interlaced with one another; timing control circuitry coupled to said input circuit means for causing the same to introduce each of said plurality of pieces of multibit information to said delay means in bit positions time spaced a predetermined plurality of bit times from one another and interlaced with the bit positions of the others of said plurality; output circuit means coupled to said delay means for utilizing the separate ones of said plurality of pieces of digital information stored therein; and circuit means coupled to said timing control circuitry for introducing bit timing control signals to said output circuit means so as to cause said output circuit means selectively to accept successive bits of different ones of said plurality of pieces of multibit digital information.

6. In an electronic digital computer which includes circulating register means for storing the bits of a plurality of pieces of binary digital information in a series of bit positions circulating through the register at successive bit times, said register including: a delay line exhibiting a time delay corresponding to a particular plurality of bit times; a plurality of serially connected unit delay means each corresponding to unity bit time connected in series with said delay line; input circuit means coupled to said delay line for introducing a plurality of pieces of multibit digital binary information to said delay line to be carried thereby interlaced with one another; timing control circuitry coupled to said input circuit means for causing the same to introduced each of said plurality of pieces of digital information to said delay line in bit positions time spaced a predetermined plurality of bit times from one another and interlaced with the bit positions of others of said plurality; output circuit means coupled to respective ones of said unit delay means for utilizing separate ones of said plurality of pieces of multibit binary digital information; and circuit means coupled to said timing control circuitry for introducing bit timing control signals to said output circuit means so as to cause said output circuit means selectively to accept successive bits of different ones of said plurality of pieces of digital information from different ones of said unit delay means.

7. In an electronic digital computer which includes circulating register means for storing the bits of a plurality of pieces of binary digital information in a series of bit positions circulating through the register at successive bit times, said register including: delay means; input circuit means coupled to said delay means for introducing a plurality of pieces of multibit binary digital information to said delay means to be carried thereby interlaced with one another; output circuit means coupled to said delay means for utilizing separate ones of said plurality of pieces of multibit binary digital information; and timing control circuit means coupled to said input and output circuit means for introducing bit timing signals thereto to cause said input circuit means to introduce each of said plurality of pieces of digital information to said delay means in bit positions time spaced a predetermined plurality of bit times from one another and interlaced with the bit positions of others of said plurality, and to cause said output circuit means selectively to accept successive bits of different ones of said pieces of digital information from said delay means.

8. In an electronic digital computer which includes circulating register means for storing the bits of a plurality of pieces of binary digital information in a series of bit positions circulating through the register at successive bit times, said register means including: a delay line exhibiting a time delay corresponding to a particular plurality of bit times; a plurality of serially connected unit delay means connected in series with said delay line and each corresponding to unity bit times; input circuit means coupled to said delay line for introducing a plurality of pieces of multibit binary digital information to said delay line to be carried thereby interlaced with one another; output circuit means coupled to respective ones of said delay means for utilizing separate ones of said pieces of multibit binary digital information and coupled to said input circuit means to circulate the same back to said delay line; and timing circuit means coupled to said input and output circuit means for introducing bit timing signals thereto for causing said input circuit means to introduce each of said plurality of pieces of digital information to said delay line in bit positions time spaced a predetermined plurality of bit times from one another and interlaced with the bit positions of others of said plurality, and for causing said output circuit means selectively to accept successive bits of different ones of said pieces of digital information from different ones of said delay means.

9. In combination: delay means for carrying a plurality of pieces of multibit binary digital information in interlaced relationship with one another in a series of bit positions and passing therethrough at successive bit times; circulating circuitry coupled to said delay means for causing the interlaced pieces of information to be recirculated therethrough; timing means coupled to said delay means for causing separate ones of said interlaced pieces of digital information to be selected and introduced to said circulating circuitry; and network means included in said circulating circuitry for modifying the selected pieces of digital information introduced to said circulating circuitry.

10. In combination: delay means for carrying bits of binary information in a series of bit positions and passing therethrough at successive bit times; input circuit means coupled to said delay means for introducing a plurality of pieces of multibit binary digital information to said delay means to be carried thereby in interlaced relationship with one another; circulating circuitry coupled to said delay means for causing the interlaced pieces of information to be recirculated therethrough; timing means coupled to said delay means for causing separate ones of said interlaced pieces of digital information to be selected and introduced to said circulating circuitry; and network means included in said circulating circuitry for modifying the selected pieces of digital information introduced to said circulating circuitry.

11. The combination defined in claim 10 in which said input circuit means includes means for causing one of said pieces of digital information introduced thereby to said delay means to have a predetermined pattern of 1 and 0 binary bits to enable such piece of information to be utilized for timing purposes.

12. The combination defined in claim 10 in which said input circuit means includes means for causing one of said pieces of digital information introduced thereby to said delay means to have a predetermined pattern of 1 and 0 binary bits, and in which said circulating circuitry includes means for causing the timing of said one of said pieces to change for each circulation thereof through said delay means.

13. The combination defined in claim 10 in which said input circuit means includes means for causing a first of said pieces of digital information introduced thereby to said delay means to have a predetermined pattern of 1 and 0 binary bits to enable such first piece of information to be used for timing purposes, in which said input circuit means includes means for causing a second of said pieces of digital information introduced thereby to said delay means to have a predetermined pattern of 1 and 0 binary bits, and in which said circulating circuit includes means for causing the timing of said second of said pieces of digital information to change for each circulation thereof through said delay means.

References Cited by the Examiner

UNITED STATES PATENTS

| | | | |
|---|---|---|---|
| 2,866,177 | 12/1958 | Steele | 340—172.5 |
| 3,056,110 | 9/1962 | Cypser et al. | 340—172.5 |

ROBERT C. BAILEY, *Primary Examiner.*

MALCOLM A. MORRISON, *Examiner.*

P. L. BERGER, *Assistant Examiner.*